(12) United States Patent
Tabirian et al.

(10) Patent No.: US 10,075,625 B2
(45) Date of Patent: Sep. 11, 2018

(54) METHOD FOR CAMERA DETECTION AND JAMMING

(71) Applicant: BEAM Engineering for Advanced Measurements Co., Orlando, FL (US)

(72) Inventors: Nelson Tabirian, Winter Park, FL (US); James Hunt, Orlando, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 0 days.

(21) Appl. No.: 14/324,126

(22) Filed: Jul. 4, 2014

(65) Prior Publication Data

US 2017/0230555 A1 Aug. 10, 2017
US 2018/0063389 A9 Mar. 1, 2018

Related U.S. Application Data

(60) Provisional application No. 61/843,001, filed on Jul. 4, 2013.

(51) Int. Cl.
*H04N 7/18* (2006.01)
*H04N 5/225* (2006.01)

(52) U.S. Cl.
CPC .......... *H04N 5/2256* (2013.01); *H04N 7/183* (2013.01)

(58) Field of Classification Search
None
See application file for complete search history.

(56) References Cited

U.S. PATENT DOCUMENTS

| | | |
|---|---|---|
| 5,621,525 A | 4/1997 | Vogeler et al. |
| 6,526,077 B1 | 2/2003 | Tabirian |
| 6,678,042 B2 | 1/2004 | Tabirian et al. |
| 6,728,049 B1 | 4/2004 | Tabirian et al. |
| 7,324,286 B1 | 1/2008 | Glebov et al. |
| 8,820,924 B2 | 9/2014 | Spaulding et al. |
| 8,911,080 B2 | 12/2014 | Spaulding et al. |
| 9,195,072 B2 | 11/2015 | Tabirian et al. |
| 9,268,154 B2 | 2/2016 | Pugh et al. |
| 9,304,328 B2 | 4/2016 | Tabirian et al. |
| 9,335,562 B2 | 5/2016 | Pugh et al. |
| 9,366,881 B2 | 6/2016 | Pugh et al. |
| 9,442,309 B2 | 9/2016 | Pugh et al. |
| 9,500,882 B2 | 11/2016 | Pugh et al. |
| 9,541,772 B2 | 1/2017 | De Sio et al. |

(Continued)

FOREIGN PATENT DOCUMENTS

WO WO 2014064679 A1 * 5/2014 ............ G01S 17/66

OTHER PUBLICATIONS

Pepper et al., "Nonlinear Optical Phase Conjugation", Sep. 1991, IEEE, pp. 21-34.*

*Primary Examiner* — James M Anderson, II
(74) *Attorney, Agent, or Firm* — Brian S. Steinberger; Law Offices of Brian S. Steinberger, P.A.

(57) ABSTRACT

Method for jamming or affecting the quality of photo and video recording, the method comprising illuminating the area, collecting light reflected or scattered from optical components such as camera lenses, amplifying them, and reversing the amplified beams back to the camera with phase conjugating mirror. The method may further comprise image acquisition and processing for identifying unwanted optical components and sensors, and electronically pointing and focusing a laser beam on said components and sensors.

8 Claims, 4 Drawing Sheets

(56) References Cited

U.S. PATENT DOCUMENTS

| | | | |
|---|---|---|---|
| 9,557,456 B2 | 1/2017 | Tabirian et al. | |
| 9,592,116 B2 | 3/2017 | De Sio et al. | |
| 9,617,205 B2 | 4/2017 | Tabirian et al. | |
| 9,658,512 B2 | 5/2017 | Tabirian et al. | |
| 9,715,048 B2 | 7/2017 | Tabirian et al. | |
| 9,753,193 B2 | 9/2017 | Tabirian et al. | |
| 9,976,911 B1 | 5/2018 | Tabirian et al. | |
| 9,983,479 B2 | 5/2018 | Tabirian et al. | |
| 2012/0162433 A1* | 6/2012 | Fuentes Gonzalez | G03B 15/07 348/151 |
| 2013/0072915 A1* | 3/2013 | Grant | A61F 9/00825 606/4 |
| 2013/0205367 A1* | 8/2013 | Sambamurthy | G06F 21/554 726/1 |
| 2015/0049487 A1* | 2/2015 | Connor | F21V 33/0076 362/277 |

* cited by examiner

METHOD FOR CAMERA DETECTION AND JAMMING

RELATED APPLICATIONS

This application claims priority to U.S. Provisional Application No. 61/843,001 filed Jul. 4, 2013, the contents of which are relied upon and incorporated herein.

FIELD OF THE INVENTION

This invention relates to privacy and counter-piracy systems with respect to photo and video recording.

BACKGROUND OF THE INVENTION

There is a growing need for detection of cameras and preventing them from taking photos and videos in restricted or forbidden areas. Such prevention is required for security, counter-piracy, privacy and other reasons; some of those situations are listed below:

Security (government/civil/military)—anti-drone (prevent drones from capturing video/photography of targets/subjects), public demonstrations, government buildings/facilities, potential terrorism targets, i.e. military installations, aircraft, ships, dockyards, weapons storage facilities, nuclear power plants, underground subway stations and civil aviation installations, dams, train stations, airports, aircraft (private/commercial), national parks.

Piracy/copyright protection—cinemas, venues, halls, stadiums, tourist attractions, concerts, shows, clubs, casinos, hotels, places of worship, museums, privately owned areas (i.e. homes), shopping malls, businesses or anywhere where "no photography" signs are posted.

Privacy—celebrities, public figures, government officials, anyone requiring anonymity.

New technologies such as Google glasses make recording of images and videos even more intrusive.

Currently there are no technologies demonstrated to prevent unauthorized photo/video recording. The objective of the present invention is to provide means for camera detection and jamming imaging sensors at least to a degree where the acquired images lose their informative, aesthetic or commercial value.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
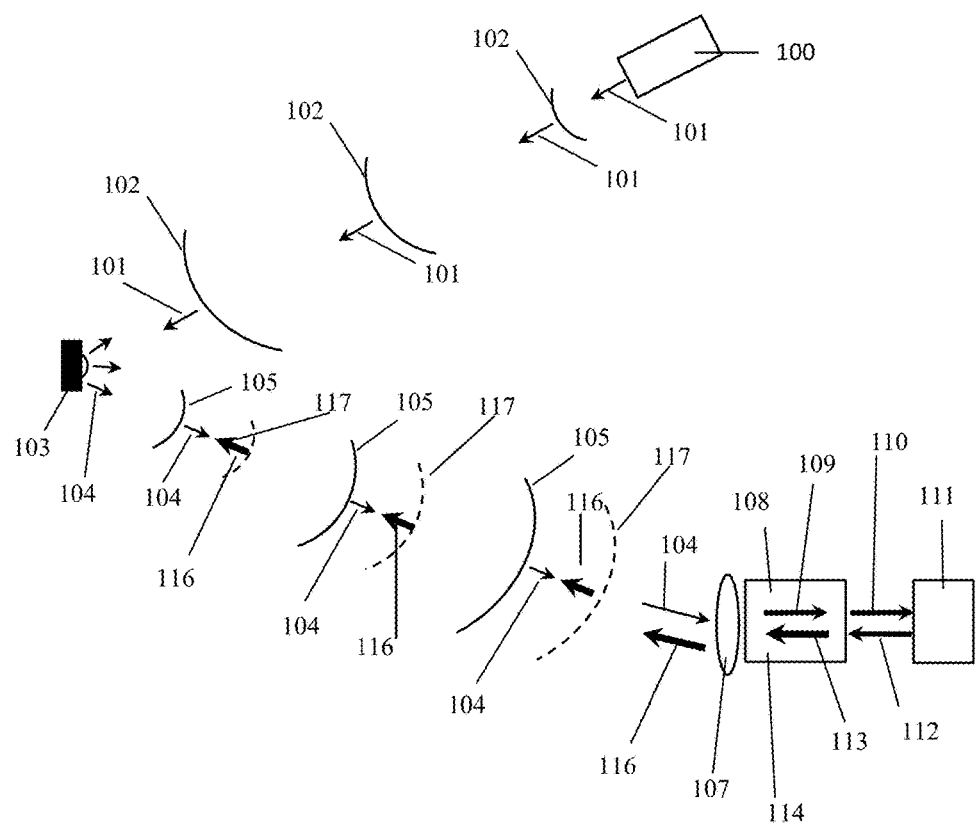
FIG. 1 shows camera detection and jamming technique based on phase conjugating (wave-front reversing) mirror.
Figure 2A:
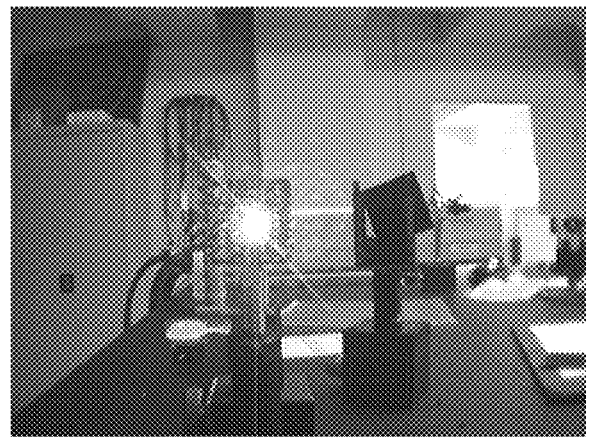
FIG. 2 shows jamming of imaging capability of camera by a laser beam.
Figure 2B:
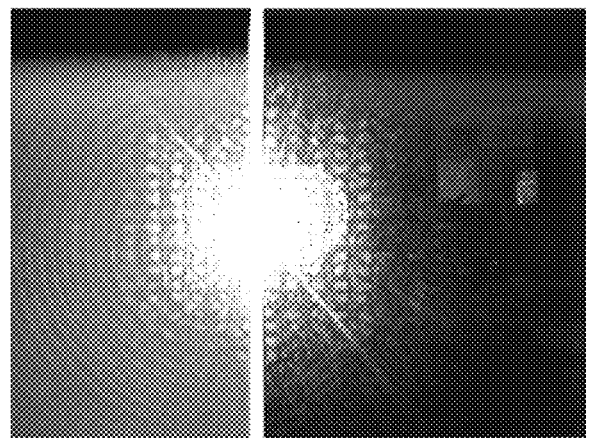

In the preferred embodiment shown in FIG. 1, the area where taking images and videos is prohibited is illuminated by a light beam 101 from a source 100 of a wavelength and intensity that are safe for the human eye. Examples of such areas include government buildings/facilities, potential terrorism targets, i.e. military installations, aircraft, ships, dockyards, weapons storage facilities, nuclear power plants, underground subway stations and civil aviation installations, dams, train stations, airports, aircraft (private/commercial), and national parks. Said light beam diverges during propagation as schematically shown in FIG. 1 by expanding wave-front of the beam 102, thus reaching a camera lens without the need of special alignment. In a preferred embodiment, the light source 100 is a laser providing a divergent coherent infrared beam 101 of wavelength such approximately 750 nm or longer, and has a power in the range of milliwatts. Several illuminators can be used for the purpose of covering a desired area or the light beam can be scanned through the area. The light beam 104 reflected from the camera optics 103 propagates expanding in space as schematically shown in FIG. 1 by arrows 104 and expanding wave-front 105, and is captured by the optical subsystem 107 of the camera detection and jamming system (CDJS). CDJS further comprises a laser amplifier 114 and optical phase conjugating mirror (OPCM) 111. The amplifier 114 amplifies the beam captured by the optical subsystem 107 and propagates said beam 110 to OPCM that reflects the beam 112 back into the amplifier 114 by conjugating its phase (reversing its phase-front). Said phase conjugated and further amplified beam 113 propagates back focusing onto the camera lens as schematically shown by the arrows pointing along propagation direction 116 and its phase fronts 117, and providing power density large enough to jam or, if required for the specific application, to damage it. The amplifier may be on or off depending on whether or not camera detection shall be accompanied by jamming. FIG. 2 shows the effect of jamming a CCD with a laser beam.

Operation of OPCM mirrors is based on recording of dynamic holographic gratings in nonlinear optical materials. In a preferred embodiment, said nonlinear optical material is a liquid crystal. In another preferred embodiment, said nonlinear optical material is a photorefractive material.

The illumination source 100 and the camera detection and jamming system can be mounted on stationary or mobile platforms, depending on the application. For example, one or both of them can be mounted on any form of transportation (i.e. a vehicle/boat/plane/motorcycle/bicycle/train), on-person, embedded in a cell-phone, glasses, headset, handbag, or other personal item, and may be powered by a battery.

Figure 3:
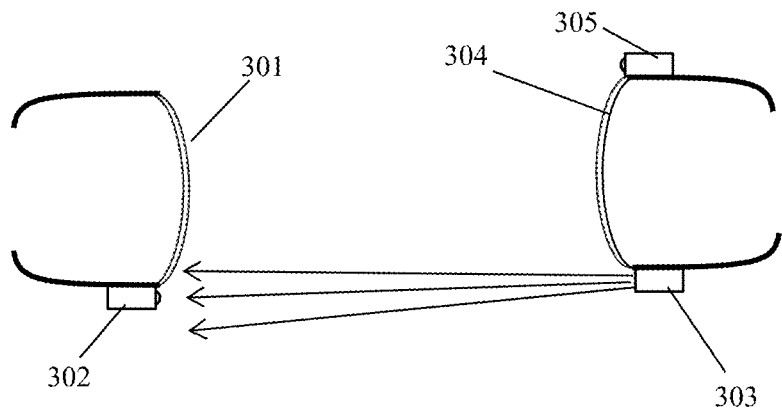
FIG. 3 schematically shows counter-recording arrangement using a glasses with frame-mounted jamming laser.

In another embodiment of the current invention the self-targeting system described above is complemented or replaced by other methods of camera detection such as image processing. For example, FIG. 3 shows a Google Glass 301 comprising a mounted camera 302 countered by anti-recording glasses 304 comprising a camera 305 and a laser beam generation and directing system 303. The images taken with the camera 305 are processed to produce information on camera lens location of the Google Glass, and the laser is activated and focused on the camera to jam it as required. The beam direction system may comprise rotating Risley prisms, phased arrays, micro-electro-mechanical systems, and a variable focus system.

The camera detection system can be further enhanced to discriminate cameras from each other or from other objects such as eyes. The discrimination system can use spectral analysis of light reflected and/or scattered from objects, and other signatures of imaging systems such as those that reflect the complex multicomponent nature of camera lenses. Note that the image processing system can be passive as well as active, requiring acquisition of actively illuminated images. Such image processing systems are well known in the art. For example, they are now routinely incorporated in even mobile phone cameras to identify heads even in the group of people.

The selective targeting systems of the current invention allow monitoring the area with low power beams, and using higher power focused beams for jamming. Thus, if the area contains sensors that need to be protected (such as eyes), the high power beam does not affect them. Another advantage of using low power illumination for detection is power saving that is essential for mobile/portable systems. In another preferred embodiment, the active imaging using laser illumination particularly at wavelengths invisible to the human eye, is activated upon a signal from passive imaging results. Then the targeting systems are activated upon a positive signal from the active imaging results.

The self-targeting systems of the current invention can be fast and compact by using electrically variable transmission systems for dynamically controlling the power of radiation. Particularly, liquid crystal variable transmission systems known in the art offer low-power/low-voltage operation compatible for portable systems. The power of the laser beam can thus be set to different limits at different stages of the system operation or for different purposes. For example, the targeting laser beam can disable the camera, jam it, or just create an area where the jamming merely affects the informative or aesthetic features of the images. Also, tuning the laser beam power may be necessary when the target cameras are at different distances.

Similarly, liquid crystal variable focal length lenses would allow focusing on objects with low-power/low-voltage electrical requirements. Electro-optical beam steering systems for directing laser beams can also be based on liquid crystal technology.

Note that the invention is not limited to cameras sensitive to visible and near infrared wavelengths only, but encompasses sensors and imaging systems for longer wavelengths, including thermal sensors.

Figure 4:
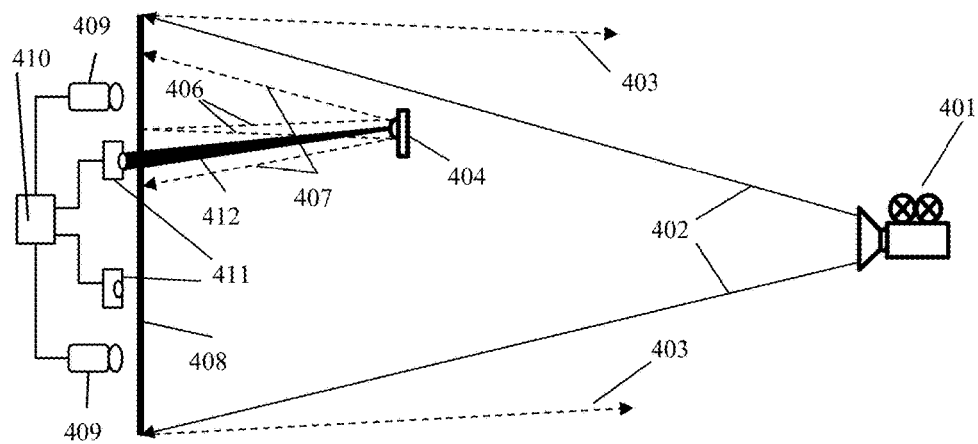
FIG. 4 schematically shows the concept of jamming cameras in a movie theater.

The case of an important particular application related to piracy is shown in FIG. 4. The projector 401 radiates light 402 illuminating the screen 408. The screen 408 thus becomes a source of illumination covering all theater area as shown by rays 403. A camera 404 is thus illuminated by rays 406 emerging from different portions of the screen 408. The light rays 407 reflected or scattered from the lens of the camera 404 makes it thus visible for imaging by sensor cameras of CDJS 409. The image processing system 410 identifies the camera (or cameras) and identifies the objects (people heads, earing, etc.) that need to be excluded from laser targeting. The information is on camera location is then provided to the electrically controlled laser beam scanning and focusing systems 411 for targeting. Using phase arrayed scanning system well known in the art allows to direct the laser beam 412 on the camera or a number of cameras only avoiding subjecting any intermediate areas to the beam. A single laser would allow targeting sequentially a multitude of cameras.

Although the present invention has been described above by way of a preferred embodiment, this embodiment can be modified at will, within the scope of the appended claims, without departing from the spirit and nature of the subject invention.

What is claimed is:

1. Camera and optical sensor detection and jamming system comprising:
    (a) a light source consisting of a single laser generating an infrared laser beam for identifying optical components of cameras by illuminating an area where taking images and videos by at least one camera is prohibited;
    (b) optical means for acquiring light of the laser beam reflected or scattered from the optical components of said at least one camera in said illuminated area; and
    (c) a self-targeting system for electronically steering and focusing said infrared laser beam onto said optical components of said at least one camera, the self targeting system amplifying the acquired light of the laser beam and reversing its propagation back to the optical components with phase conjugation obtained by a nonlinear optical material; and
    (d) a detector for detecting the at least one camera and for jamming at least one portion of the optical components of the at least one camera, wherein the at least one camera taking the prohibited images and videos is detected and jammed.

2. The system as in claim 1 wherein said means for reversing beam propagation include the phase conjugation due to dynamic holography in material with nonlinear optical response to radiation from at least one of photorefractive materials and liquid crystals.

3. The system as in claim 1 wherein said means for reversing beam propagation include adaptive optics system for electronically pointing and focusing a laser beam with a low-power, low-voltage liquid crystal electro-optical systems for focusing and steering the laser beam.

4. Camera detection and jamming system comprising:
    (a) an illuminator consisting of a single laser for illuminating an area wherein no photo and video recording is allowed, with an infrared laser beam;
    (b) at least one not authorized camera for photo and video recording the area;
    (c) image acquisition and processing system to identify at least one optical component of the at least one not authorized camera;
    (d) said infrared laser beam comprising wavelengths in the spectral range of sensitivity of the at least one not authorized camera for photo and video recording in said area cameras;
    (e) a steering system for electronically steering and focusing said infrared laser beam onto said at least one optical component of the at least one not authorized camera, said electronic means for steering and focusing not comprising moving parts;
    (f) an electronic control for electronically controlling the output power of said laser beam to provide jamming power density at the at least one optical component of the at least one not authorized camera, said electronic means for controlling the output power of said laser beam not comprising mechanically moving parts; and
    (g) a detector for detecting and jamming the at least one not authorized camera, wherein the at least one not authorized camera taking the photo and the video recording are detected and jammed.

5. The system as in claim 4 wherein said illuminator comprises at least a portion of a projection screen in a movie theater.

6. The system as in claim 5 wherein said image processing system identifies the at least one optical component of the at least one not authorized camera for the laser beam to be focused on, along with identification of an object and the area that need to be excluded from being subject to the laser beam.

7. The system as in claim 6 wherein said laser beam is triggered upon identification of the at least one optical component facing an object and the area where the taking of the images and the videos is prohibited and at time periods sufficiently short for affecting quality of recording.

8. The system as in claim 7 wherein the power of said laser beam is set at levels sufficient for affecting the quality of recording rather than for jamming it.

* * * * *